United States Patent [19]

Sturm

[11] 4,117,311
[45] Sep. 26, 1978

[54] ELECTRIC WELDING MUFF

[75] Inventor: Werner Sturm, Hägendorf, Switzerland

[73] Assignee: Von Roll AG., Gerlafingen, Switzerland

[21] Appl. No.: 777,467

[22] Filed: Mar. 14, 1977

[30] Foreign Application Priority Data

Mar. 22, 1976 [CH] Switzerland ............. 3535/76
Jan. 14, 1977 [CH] Switzerland ............. 481/77
Feb. 25, 1977 [CH] Switzerland ............. 2438/77

[51] Int. Cl.² .............................. H05B 3/58
[52] U.S. Cl. ............................ 219/544; 156/380; 219/535
[58] Field of Search ............. 219/494, 535, 544; 338/217, 218; 174/84S; 156/86, 275, 293, 380; 425/143, 144; 285/21, 286, 292, 417; 264/27, 272, 275, 332

[56] References Cited

U.S. PATENT DOCUMENTS

| 915,974 | 3/1909 | Leonard | 219/494 |
|---|---|---|---|
| 2,499,961 | 3/1950 | Lennox | 338/218 X |
| 2,689,803 | 9/1954 | Ackerman | 338/217 X |
| 3,062,940 | 11/1962 | Bauer et al. | 219/544 |
| 3,943,334 | 3/1976 | Sturm | 219/544 |
| 3,987,276 | 10/1976 | Vogelsanger et al. | 219/535 |

FOREIGN PATENT DOCUMENTS

| 217,080 | 5/1956 | Australia | 219/544 |
|---|---|---|---|
| 1,416,207 | 9/1965 | France | 219/544 |
| 1,055,305 | 4/1959 | Fed. Rep. of Germany | 219/544 |

*Primary Examiner*—Volodymyr Y. Mayewsky
*Attorney, Agent, or Firm*—Roylance, Abrams, Berdo & Farley

[57] ABSTRACT

A thermoplastic synthetic resin sleeve to be slipped over the end of a tubular member to be joined to another such member has a winding of resistance heating wire adjacent the inner surface of the sleeve. Connectors at the ends of the wire are provided to connect the wire to a source of electrified power. Small diameter wire is chosen, the resistance thereof being selected as an inverse function of sleeve diameter, so that an unregulated source of power can be used. A visual indication is provided to indicate when a good weld joint has been made.

13 Claims, 6 Drawing Figures

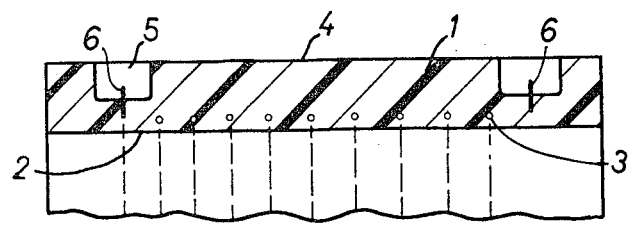
FIG. 1
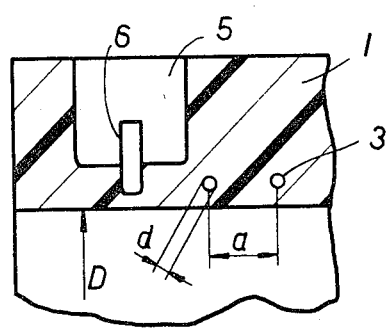
FIG. 2
FIG. 5
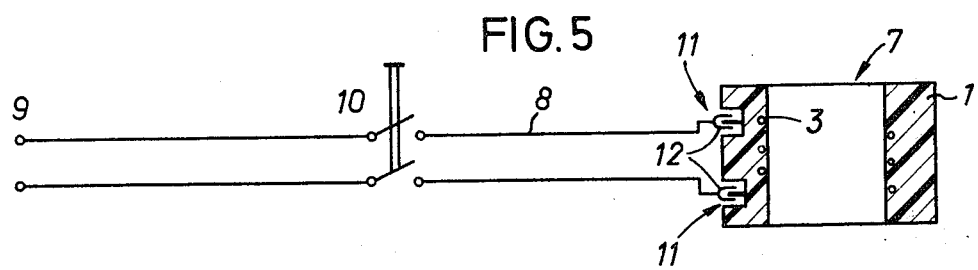
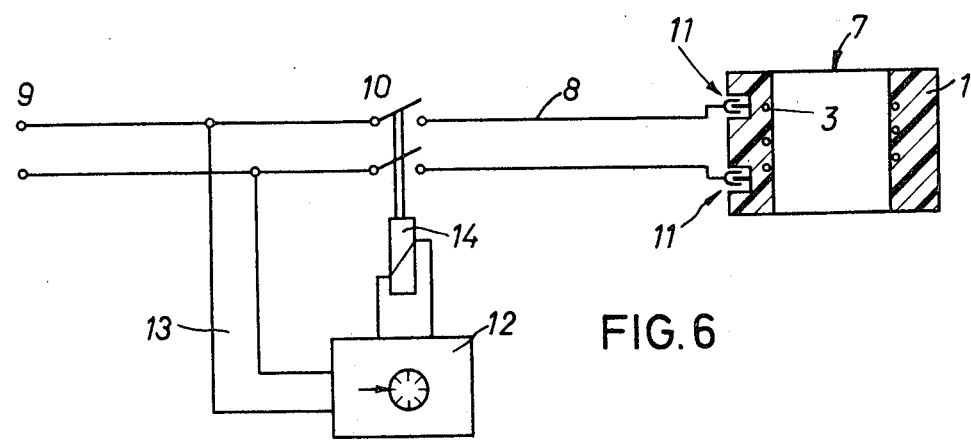
FIG. 6

ELECTRIC WELDING MUFF

This invention relates to an improved electric welding muff of the type formed from a thermoplastic synthetic resin with an electric resistance heating wire arranged in the vicinity of the inner wall of the muff body for producing welded joints between generally tubular members such as pipe sockets, pipes, shaped members and valves.

BACKGROUND OF THE INVENTION

When constructing pipe systems using pipes, shaped members and valves made from thermoplastic synthetic resin, it is clearly necessary to interconnect the individual parts. Welded joints are commonly used for such connections. A special type of welded joint is obtained by forcing a sleeve-like welding muff with a resistance heating wire inserted in the muff body onto the pipe sockets to be interconnected, after which the resistance heating wire is heated electrically so that both the material of the pipe socket and the muff are partly softened and coalesce until an intimate connection is formed. After cooling, a gas and liquid-tight weld is obtained.

Welding using such welding muff is performed with welding devices which either operate with low voltages, that is up to about 60 volts, or with mains or line voltage, in which case the muffs are effectively operated at voltages below 185 volts. The reason for this is that the welding and metering devices are able to regulate and stablize mains voltage fluctuations. However, the expenditure needed for the electrical components, primarily devices for regulating mains voltage fluctuations occur with such welding and metering devices, is considerable and they are therefore not well suited for use on building sites. When they are used for this purpose, faults often occur in such devices which can lead to defective welds. In addition, the welding times must be very precisely adhered to with the known welding and metering devices. It is necessary in the known welding muffs in which the resistance range of the wires inserted in the muff body varies from approximately 0.1 to approximately 30 ohms, depending upon the size of the diameter of the joint, have a temperature which does not differ too greatly from the basic normal temperature. Otherwise, defective welds must be expected. Thus, if the muff temperature is too low, the components will be inadequately welded. It is true that the possibility of defective welds can be counteracted to a certain extent by giving the muff body a shrinkage reserve, i.e., by expanding it. When using this technique, if an inadequate weld occurs, there will at least be a shrink joint of the components which, although possibly adequate in the case of unpressured pipe systems when no additional stresses exist, such welds are not adequate with pipe systems which are subject to stress and pressure.

BRIEF SUMMARY OF THE INVENTION

An object of the present invention is therefore to construct a muff of the type described above in such a way that no complicated welding, metering or regulating devices are necessary for the use thereof and wherein the muffs are constructed so that defective welds are avoided.

A further object is to provide a muff in which the resistance heating wire can be connected to a power supply system by a direct connection which is uncontrolled and unregulated as to current and voltage, and wherein the resistance of the resistance heating wire has a value which is an inverse function of muff diameter, the resistance decreasing with increasing muff diameter.

Briefly described, in an electric welding muff for thermally flowing to produce welded joints between generally tubular members, the invention comprises an improved welding muff of the type having a thermoplastic synthetic resin sleeve with an electric resistance heating wire disposed adjacent the inner surface of the sleeve, and means on the wire for connection to a power source, the improvement wherein the resistance of the resistance heating wire is selected according to the sleeve diameter such that the selected resistance value decreases with increasing sleeve diameter, whereby said wire is connectable to an unregulated source of electrical power.

In a further aspect of the invention, there is provided a muff of the type described wherein the resistance wire is further selected according to the sleeve diameter such that the wire diameter of the resistance wire increases with increasing sleeve diameter.

In order that the manner in which the foregoing and other objects are attained in accordance with the invention can be understood in detail, particularly advantageous embodiments thereof will be described with reference to the accompanying drawings, which form a part of this specification and wherein:

FIG. 1 is a partial longitudinal section schematically showing a welding muff in accordance with the invention;

FIG. 2 is an enlarged partial view of the section of FIG. 1;

FIG. 5 is a schematic diagram of a muff and circuit means for connecting electrical energy thereto; and FIG. 6 is a schematic diagram, partially in block form, of a further embodiment of a switching device for supplying electrical power to a muff according to the invention.

Figure 4:
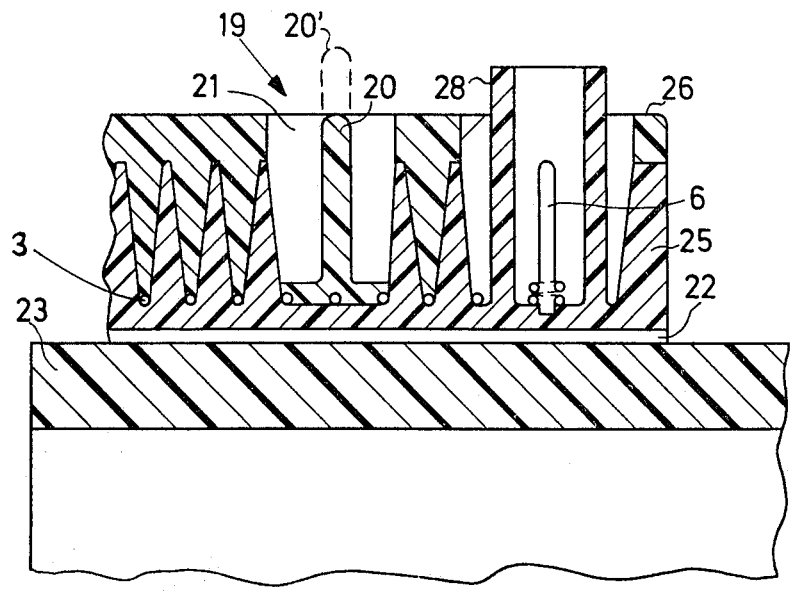
FIG. 4 is an enlarged partial section of a further embodiment of a welding muff with a pipe in accordance with the invention.

As previously indicated, the invention is advantageous because of the relatively high apparatus expenditure necessary with known welding muffs due to the need for precise regulation of the welding power to be supplied to the muff. If, in the muffs of the prior art, the regulation is less precise, there is a danger of overheating, particularly with small welding muffs or in the case of large welding muffs, there is a danger of underheating leading, in either case, to a defective weld. However, it has been found that the diameter of the resistance heating wire is made much smaller than the known welding muffs and is also selected as a function of the muff diameter, the resistance of the heating wire can be made relatively high while maintaining an approximately constant specific heating power, i.e., the heating power per unit volume of connecting surface of the welding muff. As a result, changes in the resistance have a relatively smaller influence on the value of the filament energy supplied so that it is sufficient to fix the filament energy supplied to the welding muff by the welding time only. In this connection, it is advantageous to establish the same time value, e.g., 60 seconds, for the welding time of welding muffs having different diameters but the same rated pressure stage.

When the welding muffs are used under various extreme conditions, it may be necessary to establish the occurrence of a permanent weld by using other means such as, for example, an indicator the color of which changes on reaching the correct temperature, or wherein the indicator deforms or displaces itself when a gap between parts to be welded is filled with molten material, as will be described.

Assuming a constant welding time for the welding muffs of a rated pressure stage and an approximately specific heating power, the characteristic data of the welding muffs of a fixed nominal pressure can be gathered from the following table which represents a group of muffs which have been tested in practice.

| Muff Nominal width (diameter) (mm) | Heating Wire Resistance (Ohms) | Heating Power (Watts) | Heating Wire Diameter for: | |
|---|---|---|---|---|
| | | | Isazin (mm) | Nikrothal 20 (mm) |
| 40 | 264.1 | 183.2 | 0.05 | 0.09 |
| 50 | 216.3 | 223.7 | 0.06 | 0.11 |
| 63 | 171.2 | 282.7 | 0.07 | 0.14 |
| 75 | 145.8 | 332.0 | 0.09 | 0.16 |
| 90 | 115.85 | 417.80 | 0.12 | 0.20 |
| 110 | 90.48 | 534.93 | 0.15 | 0.27 |
| 125 | 68.88 | 702.65 | 0.18 | 0.35 |
| 160 | 53.19 | 909.84 | 0.25 | 0.45 |

The heating wire types referred to in the table have the following compositions:
Isazin: 77% Cu, 21% Ni, 2% Mn
Nikrothal 20: 20% Ni, 25% Cr, remainder Fe Preferably, a "cold conductor," a conductor having a negative temperature coefficient, is used as the resistance heating wire so that the conductor has a higher conductivity at lower temperatures than at higher temperatures. If welding muffs with such wires are used at cold temperatures, there is a greater transmission of heat to the muff body so that a perfect welded joint is still obtained under such unfavorable conditions.

It will be recognized that it is also possible to use other materials for the resistance heating wire. A large number of these are available commercially and their specific resistivities vary over a relatively wide range, e.g., between 0.3 ohm/mm$^2$/m and about 1.3 ohm/mm$^2$/m. However, the essential point is that the heating wire diameter is substantially and significantly smaller than that with the known welding muffs. As can be recognized from the above table, the resistance heating wire diameter increases with an increasing welding muff diameter, for a given wire material, while the total resistance of the heating wire decreased with an increasing welding muff diameter. Also, simple calculation from the figures given in this table will demonstrate that the product of nominal muff width (diameter) multiplied by wire resistance is a substantially linear function, with some variations. Using the examples given, this product averages about 10,075 ohm-mm with variations not exceeding 16% below and 9% above this average. The change in the total resistance of the heating wire as a function of the welding muff diameter can also be achieved by holding the resistance heating wire diameter substantially unchanged but using different materials for the individual heating wires. Thus, as can be gathered for the table, for a welding muff for a nominal width of 40 mm, it is possible to use a heating wire of Nikrothal 20 with a diameter of 0.09 mm and with a muff having nominal of 75 mm, it is possible to use a heating wire of Isazin having a wire diameter of 0.09 mm, either wire being effective to obtain the desired resistance. In the same way, the same diameter can be obtained for other nominal widths by selecting other materials.

FIGS. 1 and 2 show a welding muff of the type described hereinbefore. As shown therein, a muff body 1 has on its inner peripheral surface 2, or adjacent thereto, a winding 3 of an electrical resistance heating wire. On the outer peripheral surface 4 of muff body 1, two recesses 5 are provided, each of the recesses containing one end of the heater wire winding 3 in the form of a contact stud 6 to which a source of electrical power can be connected. As can be gathered in particular from FIG. 2, the individual turns of the heating wire winding 3 are spaced apart from each other by a distance "a," which spacing is kept approximately constant preferably independently of the welding muff sleeve size because the heat flow in the muff body is not dependent on the welding muff size. As has been stated hereinbefore, the wire diameter "d" of the resistance heating wire is in a specific ratio to the muff diameter "D," the muff diameter having a value which approximately corresponds to the nominal width (diameter) of the sleeve plus twice the wall thickness of the pipe socket of the pipe parts to be welded.

Figure 3:
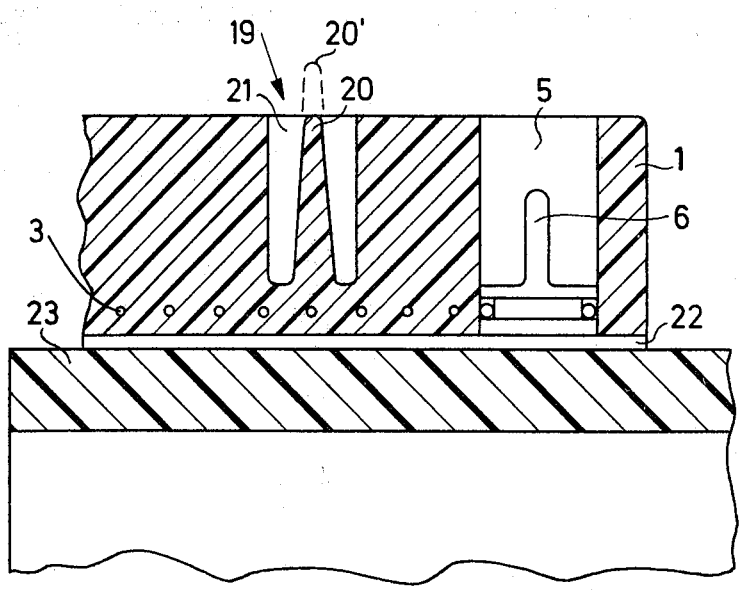
FIG. 3 is an enlarged partial section of a further embodiment of a welding muff in accordance with the invention having an indicator therein.

In FIG. 3, there is shown one end of a welding muff similar to FIG. 1, but additionally having an indicator indicated generally at 19 formed of the same material as muff body 1 and having a rod portion 20 extending radially outwardly from a portion of the sleeve adjacent the wire winding 3. As will be seen in the figure, the rod 20 is surrounded by a space 21 which can be formed by machining with, for example, a flat-ended annular drill such as a crown drill. Space 21 extends radially inwardly into the body of the sleeve close to winding 3 which, as previously described, ends in connection to a contact stud 6 which is disposed in an insert arranged in recess 5.

When the muff is used for welding and connecting together two pipe ends (only one of which is shown in FIG. 3), the material of the sleeve 1 and of the pipe end 23 close to the welding wire 3 is melted and fills the gap 22 between the sleeve and the pipe, thereby creating an increase in pressure in gap 22 by thermal expansion of the material. Thus, rod 20 is caused to rise relative to the sleeve, moving radially outwardly as indicated at 20', giving a visible signal that the welding is completed and is a perfect weld. If the muff body 1 is provided with a shrink reserve, the overpressure in the gap 22 is respectively higher.

In FIG. 4, there is also shown one end of a welding muff formed by joining two parts 25 and 26, a disclose of which structure can be found in U.S. Pat. No. 3,943,334, or British specification No. 1,440,713. The structure of FIG. 4 has an indicator 19 which operates in a manner similar to that shown in FIG. 3. In the embodiment of FIG. 4, the rod 20 is manufactured together with the outer part 26 of the muff structure by, for example, a movable mold part which is supported in an outer mold, not shown. By appropriate manufacture of the inner part 25 of the muff, there is provided the space 21 for receiving the movable molded part forming the indicator. The function of the rod 20 is the same as discussed in connection with FIG. 3. As soon as the material close to the welding wire is melting, an overpressure is produced after the gap 22 is filled, which overpressure raises the rod 20 and provides a visible indication that the welding of the muff and the tube ends is prefect. In FIG. 4, the contact stud 6 is surrounded by a protective collar 28.

Muff body 1 can be produced in several ways and it will be recognized that it is possible to use a one-part or a multi-part muff body.

FIG. 5 shows the connection of a welding muff indicated generally at 7 to a supply of electrical power such as, for example, the public mains or line voltage at 9 by a supply line 8. Power supply line 8 includes a manually operated switch schematically shown at 10 which can also be constructed as a momentary contact switch which interrupts line 8 upon release. Power supply line 8 is connected with the heating wire winding 3, formed in accordance with FIGS. 1 or 2, through electrical connections 11 which can, for example, comprise the contact stud 6 shown in FIG. 2 and a bushing 12 which is represented schematically in FIG. 5.

In FIG. 6, the winding in the welding muff 7 is connected with a power supply line 8, as discussed with reference to FIG. 5. However, in FIG. 6, the control of the actuation of switch 10 is different in that the welding time is not controlled by the manual operation of switch 10, but instead, the switch is controlled by an adjustable time switch 12 which is supplied with electrical energy by conductors 13 connected to power supply line 8. Switch 12 operates to energized and de-energize a relay winding 14 which is connected to operate switch 10 according to the predetermined welding time.

If the mains are subject to large voltage fluctuations, it is possible to compensate for these by providing a circuit which varies the welding time according to the fluctuations which occur.

The welding muff described and its construction have, in addition to the advantages mentioned hereinbefore, the advantage of lower cost as a result of the much smaller wire diameter. In addition, the muff can be used for welding pipe connections by means of a simple power supply line 8 with a switch 10 as shown in FIG. 5. The use of very small diameters of the heating wire is, surprisingly, not disadvantageous in spite of a higher surface load. Instead, it is found that the wire can move easier in the melted zone as a result, for example, of thermal elongation of the wire. Therefore, there is no danger of defective welds.

While certain advantages embodiments have been chosen to illustrate the invention, it will be understood by those skilled in the art that various changes and modifications can be made therein without departing from the scope of the invention as defined in the appended claims.

What is claimed is:
1. In an electric welding muff for thermally flowing to produce welded joints between generally tubular members, the muff being of the type comprising a thermoplastic synthetic resin sleeve with an electric resistance heating wire disposed adjacent the inner surface of the sleeve, and means on said wire for connection to a power source, the improvement wherein
said sleeve having a predetermined nominal diameter, said wire having a predetermined resistance,
said resistance and said diameter being so related that their product averages approximately 10,075 ohm-mm plus or minus 20 percent, so that the value of the resistance decreases with increasing sleeve diameter,
whereby the muff is operable with an unregulated source of power.

2. A muff according to claim 1 wherein the resistance wire is further selected according to said sleeve diameter such that the wire diameter of the resistance wire increases with increasing sleeve diameter.

3. A muff according to claim 1 wherein the diameter of said resistance heating wire is less than 0.5 mm.

4. A muff according to claim 3 wherein the diameter of said resistance wire is less than 0.35 mm.

5. A muff according to claim 1 wherein the diameter of said resistance wire is between about 0.1 mm and about 0.35 mm.

6. A muff according to claim 1 wherein the diameter of the resistance wire is selected to be substantially constant and independent of sleeve diameter and wherein the resistivity of said wire is selected in inverse proportion to sleeve diameter.

7. A muff according to claim 1 wherein said resistance wire is directly connectable to a power line at unregulated line voltage.

8. A muff according to claim 1 wherein said resistance heating wire is selected to have a negative temperature coefficient.

9. In an electric welding muff for thermally flowing to produce welded joints between generally tubular members, the muff being of the type comprising a thermoplastic synthetic resin sleeve with an electric resistance heating wire disposed adjacent the inner surface of the sleeve, and means on said wire for connection to a power source, the improvement comprising
a visible indicator mounted in said sleeve with a portion of said indicator being adjacent said wire, said indicator being movable in a visually apparent manner when said sleeve flows to a predetermined degree.

10. A muff according to claim 9 wherein said indicator is deformable.

11. A muff according to claim 9 wherein said indicator is displaceable.

12. A muff according to claim 11 wherein said indicator comprises
a rod mounted in a radially inwardly extending recess in said sleeve, said rod being made of the same material as said sleeve,
said rod being movable radially outwardly by the pressure of flowing sleeve material as said material flows into said recess.

13. In an electric welding muff for thermally flowing to produce welded joints between generally tubular members, the muff being of the type comprising a thermoplastic synthetic resin sleeve with an electric resistance heating wire disposed adjacent the inner surface of the sleeve, and means on said wire for connection to a power source, the improvement wherein
said sleeve has a predetermined nominal diameter, and
said wire has a predetermined resistance,
said resistance being a function of said diameter according to the relationship defined by the following values:

| Nominal Sleeve Diameter (mm) | Wire Resistance (Ohms) |
| --- | --- |
| 40 | 264.1 |
| 50 | 216.3 |

-continued

| Nominal Sleeve Diameter (mm) | Wire Resistance (Ohms) |
|---|---|
| 63 | 171.2 |
| 75 | 145.8 |
| 90 | 115.85 |
| 110 | 90.48 |
| 125 | 68.88 |
| 160 | 53.19 | whereby said resistance decreases with increasing sleeve diameter to permit the muff to be operated with an unregulated source of power.

* * * * *